(12) United States Patent
Ismagilov et al.

(10) Patent No.: US 11,780,579 B2
(45) Date of Patent: *Oct. 10, 2023

(54) AERIAL VEHICLE WITH UNCOUPLED HEADING AND ORIENTATION

(71) Applicant: VECTORED PROPULSION TECHNOLOGIES INC., North York (CA)

(72) Inventors: Linar Ismagilov, North York (CA); Maksym Korol, Hamilton (CA)

(73) Assignee: VECTORED PROPULSION TECHNOLOGIES INC., North York (CA)

( * ) Notice: Subject to any disclaimer, the term of this patent is extended or adjusted under 35 U.S.C. 154(b) by 490 days.

This patent is subject to a terminal disclaimer.

(21) Appl. No.: 16/921,354

(22) Filed: Jul. 6, 2020

(65) Prior Publication Data

US 2020/0331606 A1    Oct. 22, 2020

Related U.S. Application Data

(63) Continuation of application No. 15/499,023, filed on Apr. 27, 2017, now Pat. No. 10,737,780.
(Continued)

(51) Int. Cl.
*B64C 39/02*    (2023.01)
*B64C 27/08*    (2023.01)
(Continued)

(52) U.S. Cl.
CPC ............ *B64C 39/024* (2013.01); *B64C 27/08* (2013.01); *B64C 27/20* (2013.01); *B64C 27/28* (2013.01);
(Continued)

(58) Field of Classification Search
CPC ....... B64C 39/024; B64C 27/08; B64C 27/20; B64C 27/28; B64C 27/52; B64C 29/0033; B64C 2201/024; B64C 2201/027
See application file for complete search history.

(56) References Cited

U.S. PATENT DOCUMENTS

| 6,892,980 B2 | 5/2005 | Kawai |
| 7,472,863 B2 | 1/2009 | Pak |

(Continued)

FOREIGN PATENT DOCUMENTS

| WO | 2008054234 A1 | 5/2008 |
| WO | 2010137016 A3 | 10/2011 |

OTHER PUBLICATIONS

Fernandes, "Design and construction of a multi-rotor with various degrees of freedom", Technical University of Lisboa, 2011, pp. 1-10, Lisbon, Portugal.
(Continued)

*Primary Examiner* — Nga X Nguyen
(74) *Attorney, Agent, or Firm* — Norton Rose Fulbright Canada LLP

(57) ABSTRACT

An aerial vehicle includes a hull containing the main processor, energy storage, support components such as sensors, wireless communication, and landing gear. Attached to the hull are at least three thrust or propulsion units each with two degrees of freedom from the hull allowing them to orient independently in any direction and apply thrust independently from the hull or any other thrust or propulsion unit. In some embodiments, a mount for auxiliary attachments is included or the auxiliary system is built into the hull. Components like the energy storage, auxiliary attachments, and/or propulsion units may also be replaceable as required.

24 Claims, 7 Drawing Sheets

Related U.S. Application Data

(60) Provisional application No. 62/328,266, filed on Apr. 27, 2016.

(51) Int. Cl.
  *B64C 27/52*   (2006.01)
  *B64C 27/28*   (2006.01)
  *B64C 29/00*   (2006.01)
  *B64C 27/20*   (2023.01)
  *B64U 10/10*   (2023.01)
  *B64U 10/13*   (2023.01)

(52) U.S. Cl.
  CPC .......... *B64C 27/52* (2013.01); *B64C 29/0033* (2013.01); *B64U 10/10* (2023.01); *B64U 10/13* (2023.01)

(56) References Cited

U.S. PATENT DOCUMENTS

| | | |
|---|---|---|
| 9,817,396 B1 | 11/2017 | Takayama |
| 9,975,644 B1 | 5/2018 | Kimchi |
| 10,737,780 B2* | 8/2020 | Ismagilov ............... B64C 27/52 |
| 2016/0023755 A1 | 1/2016 | Elshafei |
| 2016/0264234 A1* | 9/2016 | Vaughn ................. B64C 39/024 |

OTHER PUBLICATIONS

Tilt Racing Drone, Jun. 15, 2017, http://www.tiltdrone.com/.
Segui-Gasco et al., "A Novel Actuation Concept for a Multi Rotor UAV" (2014) 74:1 Journal of Intelligent & Robotic Systems, Nov. 22, 2013, 19 pages, Springer Science+Business Media Dordrecht.

* cited by examiner

AERIAL VEHICLE WITH UNCOUPLED HEADING AND ORIENTATION

CROSS REFERENCE TO RELATED APPLICATIONS

This application is a continuation of U.S. patent application Ser. No. 15/499,023 filed on Apr. 27, 2017, which claims the benefit of U.S. Provisional Patent Application No. 62/328,266 filed on Apr. 27, 2016, all of which are herein incorporated by reference in their entirety.

FIELD

The present disclosure generally relates to the field of aerial vehicles.

INTRODUCTION

Multirotor drones or rotorcraft vehicles are able to hover, perform vertical take-off and landing (VTOL), and fly in any direction, but their orientation directly affects their heading. This limits maneuverability to their inertia. This also limits how large a relatively stable multirotor can be made.

There is a need for higher-performance vehicles with more maneuverability, precision, and stability for various applications of standard multirotor drones which may be limited to a relatively small size.

SUMMARY

In accordance with one aspect, there is provided an aerial vehicle, capable of hover and flight in any orientation completely independent of its three-dimensional heading. The vehicle has a hull containing the processor, energy storage, and any supporting components like landing gear, wireless communication, and/or sensors. In some embodiments the vehicle has three or more thrust or propulsion units, of which, at minimum two are gimballed thrust units capable of two rotational degrees of freedom with respect to the hull and other thrust and propulsion units. Gimballed thrust units can orient and vary their thrust and direction independently to the hull or any other thruster or propulsion unit.

The aerial vehicle may have individual motors for each propulsion unit for separate control of thrust by the control unit. The propulsion units may have a gimbal frame that enables tilting of the motors in two degrees-of-freedom to allow rotational capability.

The aerial vehicle may have one or more permanently installed auxiliary system or other attachments. Such auxiliary systems can be payloads, batteries, cameras, sensors, actuators, electronics, or other modules that provide functionality to the vehicle The aerial vehicle may have at least one mount for auxiliary attachments. Such attachments can be payloads, batteries, sensors, actuators, electronics, or other modules that provide functionality to the vehicle.

The control unit issues control commands to rotate the propulsion units using the gimbal frame based on a computed rotation metric provided by the control unit.

In accordance with one aspect, there is provided a process for an aerial vehicle. The process may involve determining a current orientation measurement and heading using sensor data; determining a rotation metric using the current orientation and heading measurement and a target orientation and heading measurement; and triggering control commands for actuating movement of propulsion units relative to a gimbal frame based on the rotation metric and varying their thrust, the movement independent of the hull or any other thruster or propulsion unit. The process may involve preprocessing the sensor data.

In various further aspects, the disclosure provides corresponding systems and devices, and logic structures such as machine-executable coded instruction sets for implementing such systems, devices, and methods.

In some embodiments, there is provided an aerial vehicle with at least three gimballed thrust or propulsion units driven by an on board electrical power source and processor. The processor can determine a current orientation and heading measurement and heading using sensor data, and determine a rotation metric using the current orientation and heading measurement and a target orientation and heading measurement. The processor triggers control commands for actuating movement of the at least three thrust or propulsion units relative to a gimbal frame based on the rotation metric and varying their thrust, the movement independent of a hull or any other thruster or propulsion unit.

The aerial vehicle is capable of varying thrust and orient independently to the hull or any other thruster or propulsion unit.

The aerial vehicle is capable of hover and flight in any orientation completely independent of its three-dimensional heading.

The aerial vehicle can have at least two gimballed thrust or propulsion units with the ability to orient and vary thrust independently to the hull or any other thrusters or propulsion units.

The aerial vehicle can drive by any power source or combination of power sources, including on board hybrid electric generating methods, pneumatic, hydraulic, fossil fuel or others.

The aerial vehicle has at least two gimballed thrust or propulsion units with the ability to orient and vary thrust independently to the hull or any other thrusters or propulsion units, driven by any power source or combination of power sources, including on board hybrid electric generating methods, pneumatic, hydraulic, fossil fuel or others.

The aerial vehicle can have supporting components like landing gear, wireless communication and/or sensors.

The aerial vehicle can have detachable gimballed thrust or propulsions units.

The aerial vehicle can have at least one mount for auxiliary attachments. Such attachments can be batteries, sensors, actuators, electronics, or other modules that provide functionality to the vehicle.

The aerial vehicle can have a permanently installed auxiliary system or other attachment.

In another aspect, embodiments provide a process for an aerial vehicle that determines a current orientation measurement and heading using sensor data, and determines a rotation metric using the current orientation and heading measurement and a target orientation and heading measurement. The process triggers control commands for actuating movement of at least three thrust or propulsion units relative to a gimbal frame based on the rotation metric and varying their thrust, the movement independent of the hull or any other thruster or propulsion unit.

In some embodiments, the process involves preprocessing the sensor data.

In another aspect, embodiments provide an aerial vehicle capable of hover and flight in any orientation completely independent of its three-dimensional heading. The aerial vehicle has at least three gimballed thrust or propulsion units driven by an on board electrical power source with the ability to vary thrust and orient independently to the hull or any other thruster or propulsion unit.

The aerial vehicle can have at least two gimballed thrust or propulsion units with the ability to orient and vary thrust independently to the hull or any other thrusters or propulsion units.

The aerial vehicle can be driven by any power source or combination of power sources, including on board hybrid electric generating methods, pneumatic, hydraulic, fossil fuel or others.

The aerial vehicle can have at least two gimballed thrust or propulsion units with the ability to orient and vary thrust independently to the hull or any other thrusters or propulsion units, driven by any power source or combination of power sources, including on board hybrid electric generating methods, pneumatic, hydraulic, fossil fuel or others.

The aerial vehicle can have a processor, supporting components like landing gear, wireless communication and/or sensors.

The aerial vehicle can have detachable gimballed thrust or propulsions units.

The aerial vehicle can have at least one mount for auxiliary attachments. Such attachments can be batteries, sensors, actuators, electronics, or other modules that provide functionality to the vehicle.

The aerial vehicle can have a permanently installed auxiliary system or other attachment.

The embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments provide an aerial vehicle with uncoupled heading and orientation capable of hover and flight in any orientation independent of its three-dimensional heading. The aerial vehicle with uncoupled heading and orientation may have configurations of three or more propulsion units according to some embodiments. The thrust units can be gimballed such that they are capable of two degrees of freedom from the hull and other thrust or propulsion units.

According to example embodiments, the vehicle includes a hull containing the energy storage, support components such as payloads, sensors, control units, and landing gear. Attached to the hull is at least three propulsion units each with two degrees of freedom from the hull allowing them to orient and apply thrust in any direction independently from one another or the hull.

In some embodiments a mount for auxiliary attachments is included or the auxiliary system is built into the hull. Components like the energy storage, auxiliary attachments, and/or propulsion units may also be easily replaceable as required. Propulsion units may be integrated or detachable.

Embodiments of methods, systems, and apparatus are described through reference to the drawings.

Figure 1:
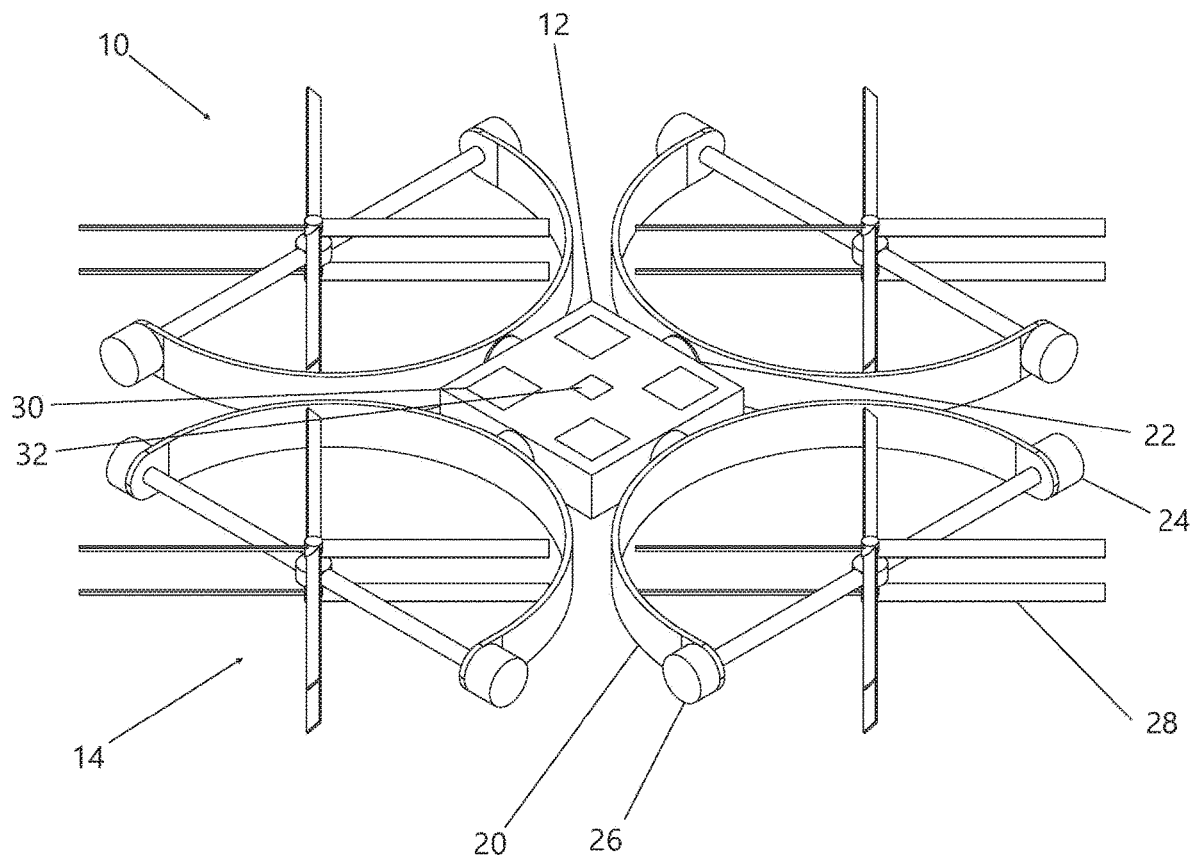
FIG. 1 is a view of an example of embodiment of an aerial vehicle with uncoupled heading and orientation.

FIG. 1 shows an isomeric view of an embodiment of an aerial vehicle 10 as an illustrative example.

The aerial vehicle 10 includes a hull assembly 12 containing any amount of battery packs 30 and the main control unit 32. A multitude of thruster or propulsion units 14 are attached to the hull. The whole vehicle 10 contains various components. A gimbal frame 20 from each propulsion unit 14 is attached to both the primary servo motor 22 and the secondary servo motor 24. The primary servo motor 22 rotates the gimbal frame 20 with respect to the hull assembly 12. The secondary servo motor 24 rotates the rotor assembly 28 with respect to the gimbal frame 20. The primary servo motor 22 and secondary servo motor 24 are mounted orthogonally to facilitate the full orientation freedom of the rotor assembly 28 with respect to the hull assembly 12. The rotor assembly receives power through a mechanical coupling with the propulsion motor 26. In an example embodiment, the hull assembly 12 and the propulsion units 14 are connected through the primary servo motor 22.

The aerial vehicle 10 includes at least one battery pack 30.

The aerial vehicle 10 includes a main control unit 32 to control components of the aerial vehicle 10. The main control unit 32 may be implemented as a microcontroller, as described herein.

In some embodiments, the gimbal frame 20 may use two servo motors to provide independent movement to the propulsion unit 14, provided by the primary servo motor 22 and the secondary servo motor 24. The combination of the possible rotations provided by the two servo motors allows the rotor assembly 28 to keep pointed or oriented in the vector arranged by the main control unit 32.

The hull assembly 12 provides a structure for all components to attach to and coordinate function. In some embodiments, the hull assembly 12 is made using a carbon fiber composite structure, but other lightweight manufacturing methods including aluminum and plastics may also be used for the aerial vehicle. The locations of each component are used by the main control unit to determine the required data for each actuator and how data from each sensor can be used or combined to generate that data. The flight process customization is done at power-up or as needed, such as when the components are changed.

Figure 2:
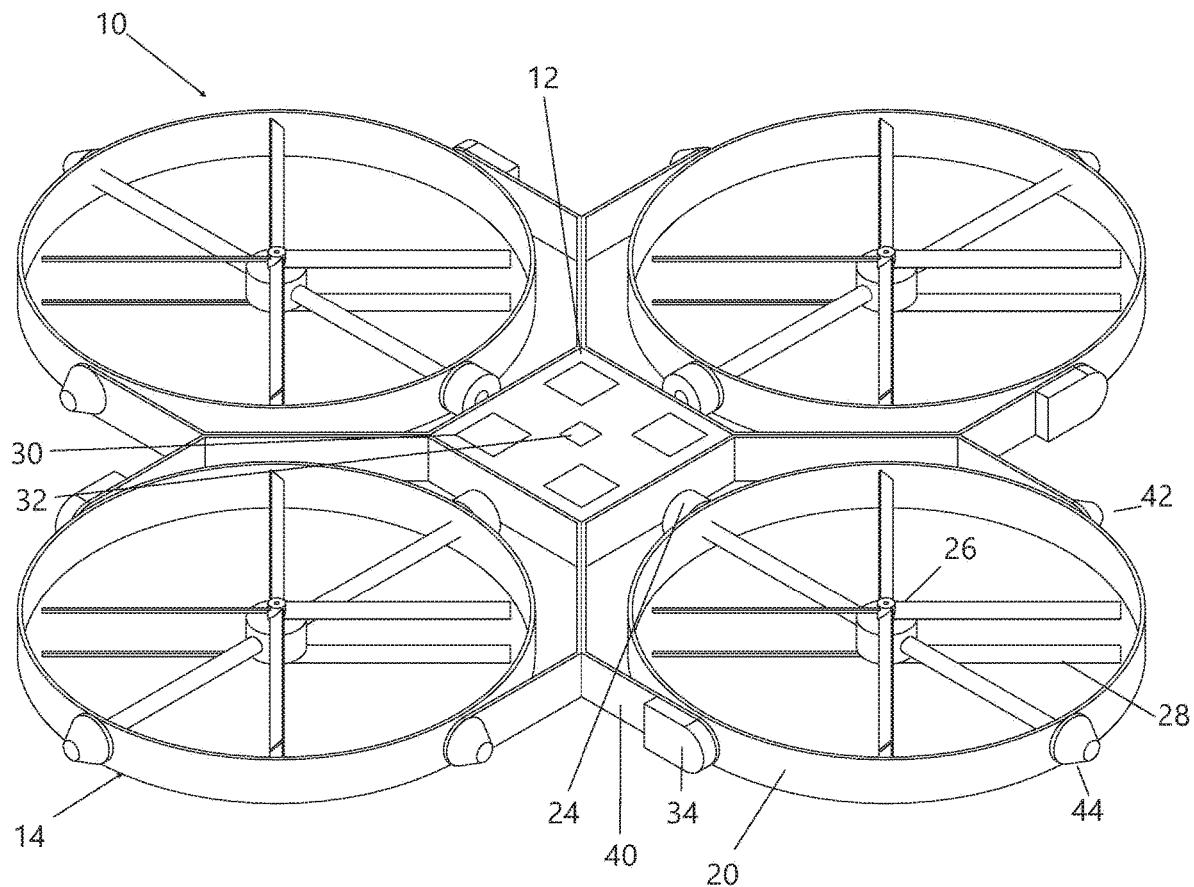
FIG. 2 is a view showing an alternate example of an arrangement for propulsion units in a vehicle.

FIG. 2 shows another example embodiment of the aerial vehicle 10. The propulsion unit 14 is in a different configuration where the power and data lines are not running through the servo motors, and are instead transferred through a primary slip ring 42, or through a simple wire bundle. This requires a mounting on both sides of the gimbal frame 20 to the gimbal mount 40. The propulsion motor 26 is also mounted directly to the rotor assembly 28 and because of that requires power to be transferred through a secondary slip ring 44 mounted on the gimbal mount 40. This alternate and more complicated configuration allows for higher power densities and lift when the configuration detailed in FIG. 1 would exhibit too much frame flex, but the function and software is maintained.

Figure 3:
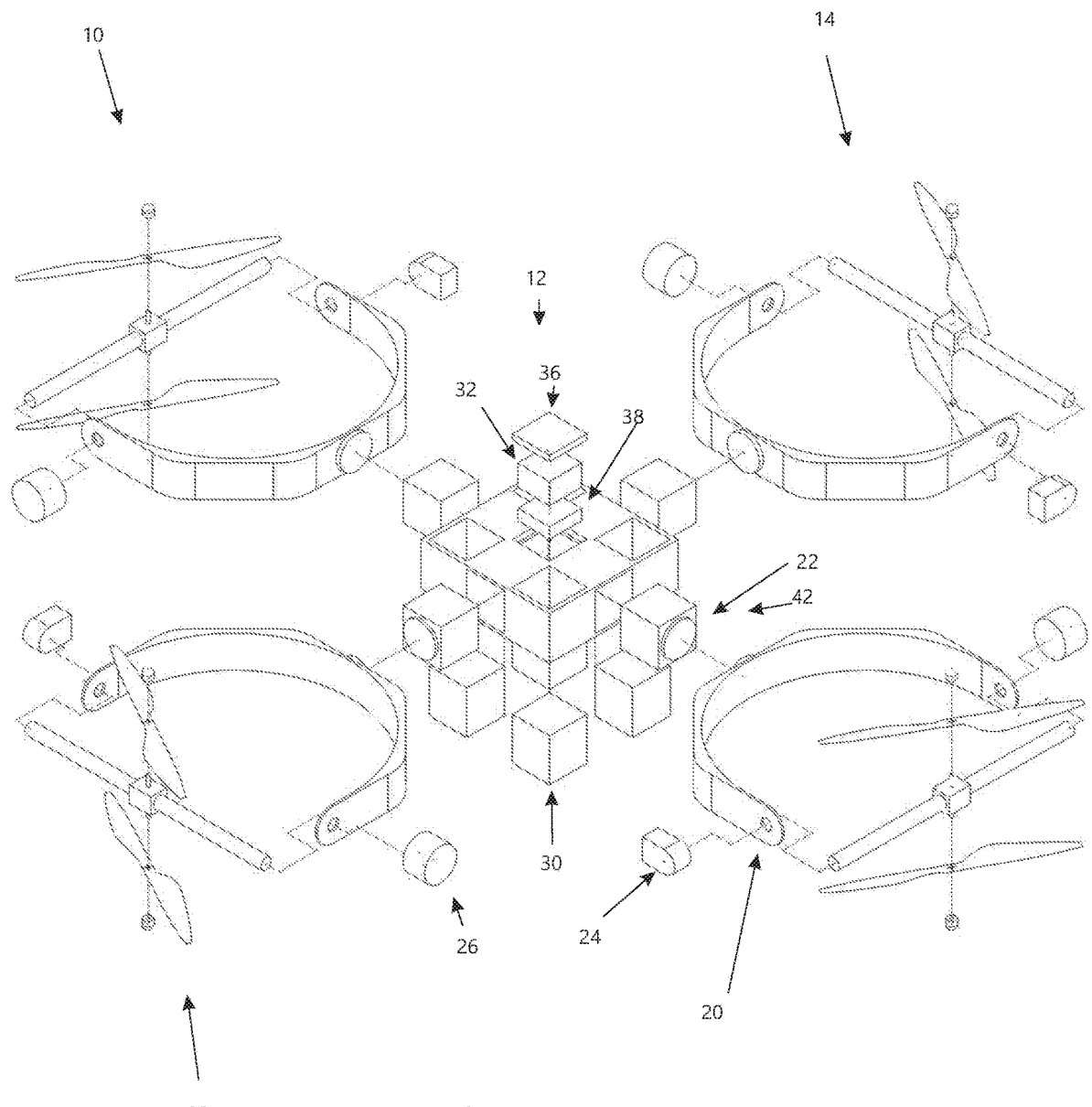
FIG. 3. is an exploded view of an example embodiment of an aerial vehicle with uncoupled heading and orientation.

FIG. 3 shows an exploded view of all subassemblies within another example embodiment of the aerial vehicle 10. The example shows connections between the various components of aerial vehicle 10 including the components within the hull 12. The hull 12 provides power to all propulsion units 14 and other units through the power distribution unit 38 that draws power from battery packs 30. The whole vehicle 10 is controlled by the main control unit 32 and can be interfaced and can be configured through a display 36. As in the example embodiment as shown in FIG. 1, the power and data pass through the primary servo motor 22 to the rest of the propulsion units 14.

Figure 4:
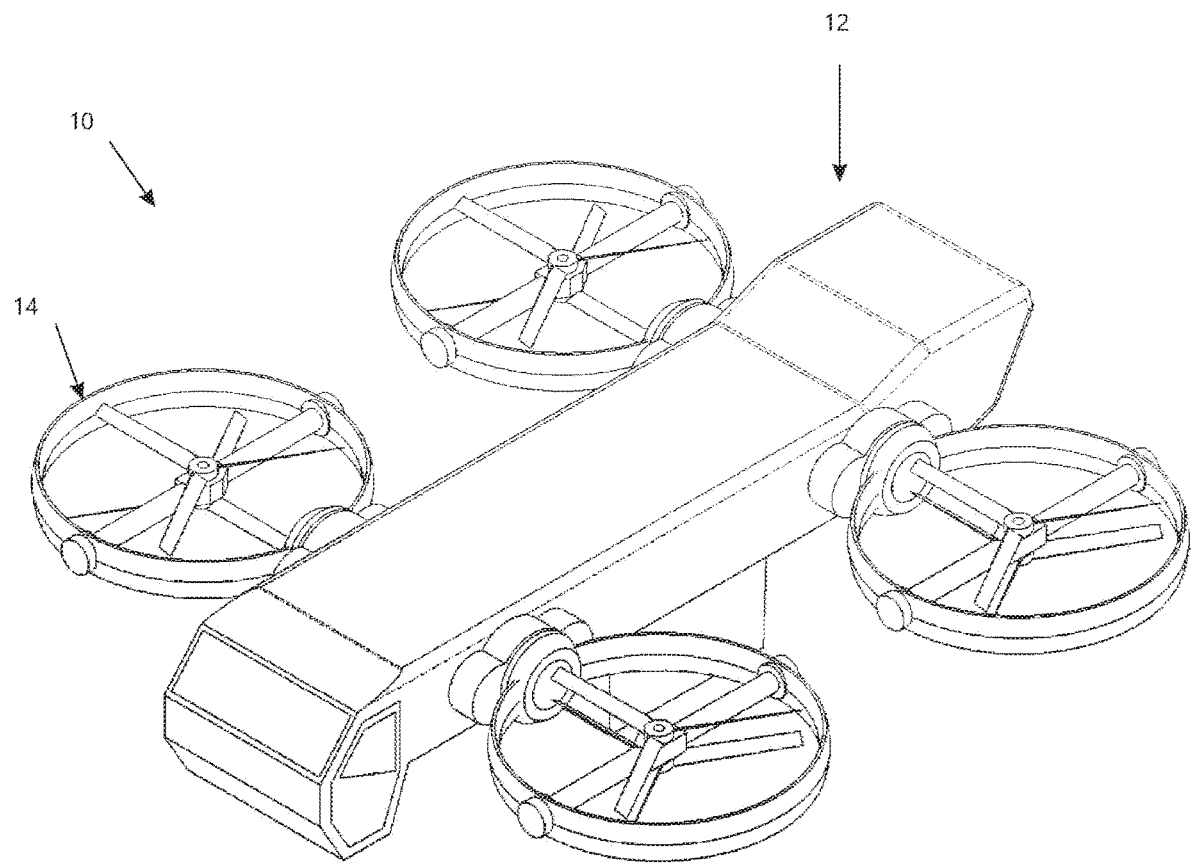
FIG. 4. is a view of an example of embodiment of an aerial vehicle with uncoupled heading and orientation in a stable configuration.

FIG. 4 shows another example embodiment of the aerial vehicle 10 by not having or requiring symmetrically mounted propulsion units 14 and having a hull 12 at an arbitrary size.

The propulsion units 14 may be placed at any location of a vehicle 10 and can be comprised on different power capabilities. This is exemplified by the configuration of an alternative embodiment shown in FIG. 4. To allow the vehicle 10 six degrees-of-freedom (6DOF), the main control unit 32 intelligently distributes the required thrust between the propulsion units 14 to provide a collective sum specified by the pilot, for example.

The control of the vehicle 10 may be provided through actuation by the main control unit of a variety of electrical and mechanical components, with the most basic flight controls being vectors and moments at the center of gravity for the vehicle to generate. The main control unit 32 may accept a variety of data through different communication methods to facilitate manual, semi-autonomous, or fully autonomous control and configurations.

For example, the vehicle 10 may be controlled through a fly-by-wire system that uses the information provided by an IMU (inertial measurement unit) within the main control unit 32 as well as the instructions by the controller. The details are found subsequently.

To achieve flight in any orientation, the collective thrust vector at the center of gravity of the vehicle 10 is a combination of the inverse gravity vector and the target acceleration vector. This is done separately and does not have to be identical in all three axes. This means that both the gravity vector and the target movement vector may be in any axis without any difference in calculation, therefore enabling hover in any orientation of the vehicle 10 at a software level. The collective thrust vector is split between each propulsion unit dynamically and sometimes preferentially. That is, the total of the collective thrust vector may be split within different classes of propulsion units for different reasons. Large propulsion units 14 may be given priority for producing the inverse gravity vector while small propulsion units are given priority for heading correction for quick thrust response from the controller.

To achieve any arbitrary orientation, the collective moment vector at the center of gravity of the vehicle may be split within the propulsion unit dynamically and sometimes preferentially. Each axis of the collective moment vector is a combination of the thrust variations within the propulsion units on the rotation axes that combine to a sum of zero, so heading is not affected by the orientation adjustment.

Since both the collective thrust vector and the collective moment vectors are absolute units, no vector is a multiplier for the thrust to be produced by the propulsion units and are may be computed in no specific order, or even at different rates. The only exceptions are calibrated modifiers.

Since there may not always be a clear path for air to flow through the propulsion units, some orientations of the vehicle will require more power to produce the equivalent thrust. For this, calibrated modifiers are used to overcome the drag produced by air passing over the hull or any other components to provide consistent response. The calibrated modifiers are determined empirically by the main control unit 32 during a calibration process in the vehicle, and when determined, modify the final thrust output of the vehicle 10 dynamically based on the orientation, acceleration, propulsion unit failure, or other factors as needed. Each factor may require the vehicle 10 (e.g. control unit 32) to determine the thrust difference to the same orientation or heading in static hover.

During the calibration process in some embodiments, the vehicle may change orientations during static hover and by difference in power required for static hover in each orientation, calculate a calibrated modifier for orientation changes. In some embodiments, the vehicle will also determine the difference in power required to obtain acceleration in each axis and calculate the calibrated modifier for acceleration. The vehicle may also cut power to a propulsion unit and use the difference in required power in the other propulsion units to determine the calibrated modifier in case that propulsion unit should fail.

The propulsion units 14 may use a different method of achieving independent orientation and thrust. An example is provided by the difference in configuration of the propulsion units 14 between FIG. 1 and FIG. 2. Further alternate configurations of the same novel functions can be possible by using more than two servo motors for changing the orientation of the rotor assembly 28. The servo motors can be placed in non-orthogonal arrangements, which may be particularly attractive for smaller embodiments of the vehicle.

Embodiments can have different hull shape configurations with more than two propulsion units 14. There may be variations in materials or specifics of the configuration. In the figures provided, a simple box-like structure is used, but any shape designed to attach to propulsion units 14 can work equally well because the shape of the hull does not affect the novel freedom of orientation and heading disclosed herein. The shape only affects the variance of the calibrated modifiers, which means that more aerodynamic shapes are simply a more efficient configuration.

As noted, the aerial vehicle 10 includes a hull 12 containing the main control unit 32 (microcontroller) coupled to energy storage and support components such as sensors, wireless communication, and landing gear. The control unit 32 electronically controls each thruster or propulsion units 14, each with two degrees of freedom from the hull where the control unit 32 actuates components to orient the propulsion units 14 independently in any direction and apply thrust independently.

The embodiments of the control unit 32 may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to control various components of vehicle 10. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The main control unit 32 may represent one or more microprocessors or computing devices having at least one processor configured to execute software instructions stored on a computer readable tangible, non-transitory medium.

Figure 5:
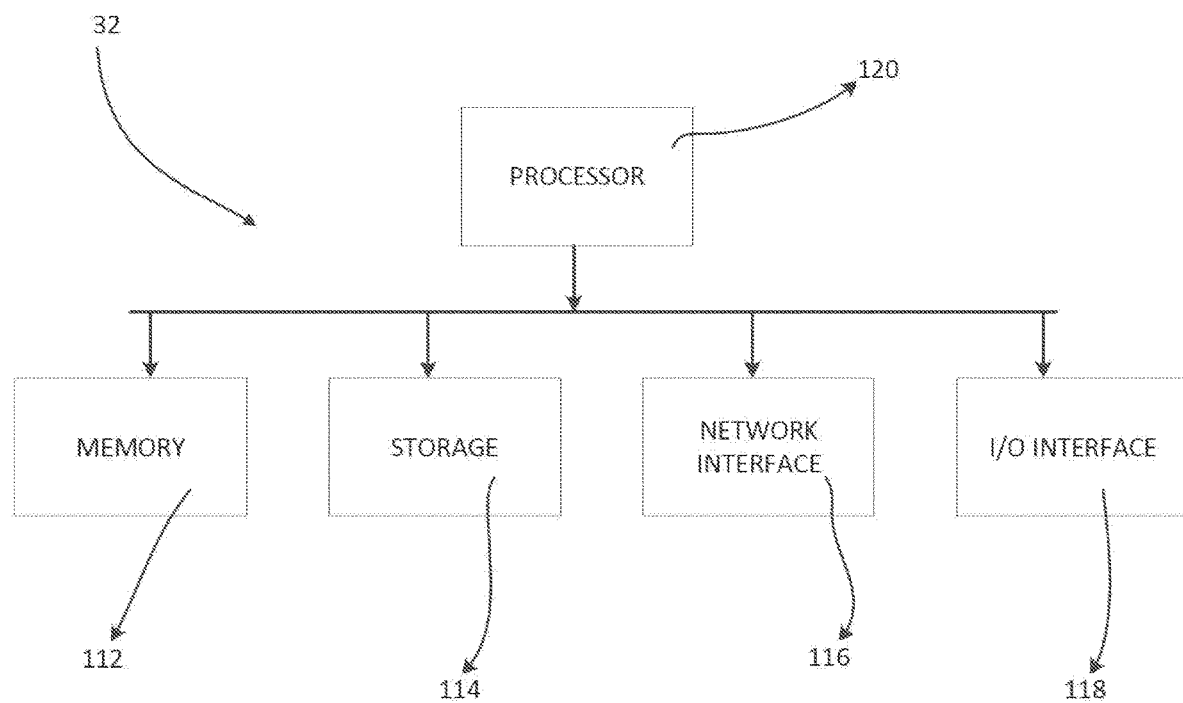
FIG. 5 is a view of an example control unit for the aerial vehicle with uncoupled heading and orientation.

FIG. 5 illustrates a diagram of an example main control unit 32. As depicted, main control unit 32 includes one or more processors 120, memories 112, persistent storage 114, network interfaces 116 and input/output interfaces 118. Processor 120 may operate under control of software stored, for example, in persistent storage 114 and loaded in memory 112. Network interface 116 connects vehicle 10 to networks for wireless communication. I/O interface 118 further connects to one or more other hardware units such as sensors, display, propulsion units, and so on.

Figure 6:
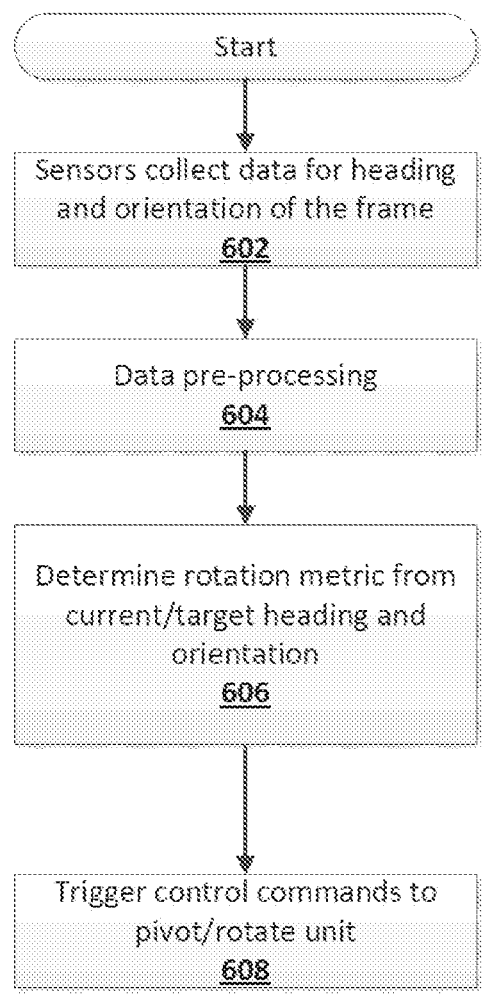
FIG. 6 is an example flow chart of a process for the aerial vehicle with uncoupled heading and orientation.

FIG. 6 illustrates an example process flow with aspects implemented by control unit 32. The control unit 32 couples to gimbal frame 20 and propulsion units 14 to provide hover and flight control independent of the three dimensional heading or orientation of the vehicle 10. The gimbal frame 20 and propulsion units 14 enable rotation and control unit 32 to send control signals to each propulsion unit 14 independently.

At 602, sensors of vehicle 10 detect the current orientation and heading of the gimbal frame 20. This is mainly done through an inertial measurement unit (IMU) included inside the main control unit 32 or included in the hull 12. The IMU is able to determine the orientation and acceleration of the hull 12 and from that the main control unit 32 is able to calculate the pose of the entire vehicle. Additional sensors like a GPS receiver may also be included within the main control unit 32 or the hull 12, and can provide velocity and position of the vehicle relative to the environment.

At 604, the sensor or the control unit 32 pre-processes the sensor data. For example, the sensor information may not be complete and may need pre-processing to get required information. This is often a filtering of data or a combination of sensor data to determine one metric, such as orientation determined by the combination of the accelerometer and gyroscope inside the IMU or how position information provided by the GPS must be filtered for outliers to prevent incorrect data from being used in subsequent stages.

Figure 7:
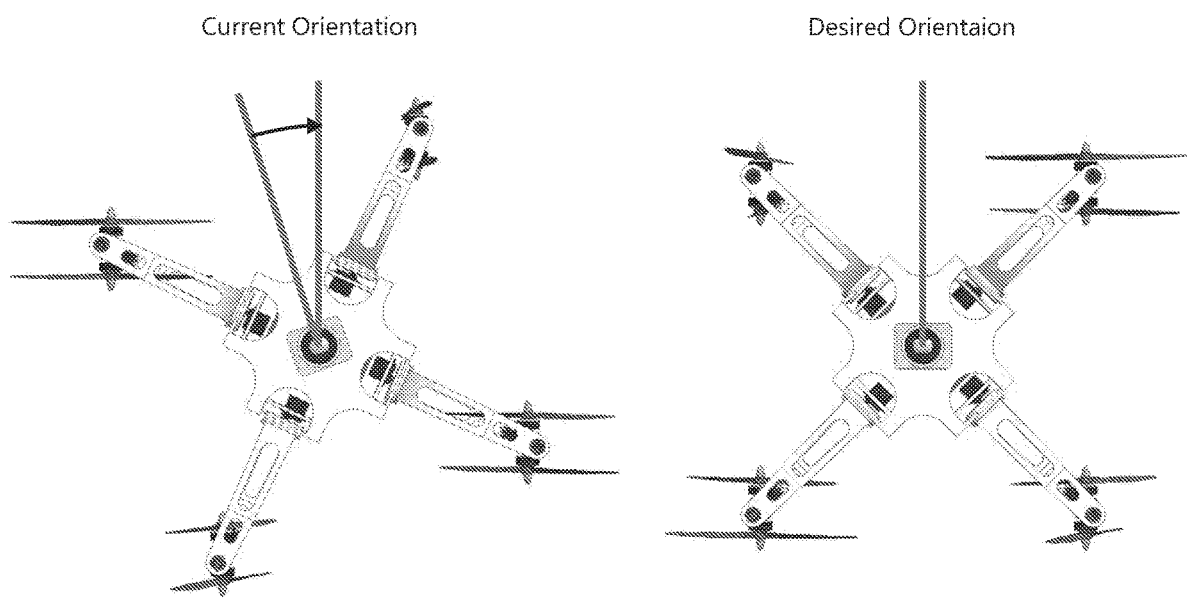
FIG. 7 is a view of an aerial vehicle with uncoupled heading and orientation at a current orientation and a target orientation.

At 606, the control unit 32 receives the current orientation, heading, and other data from sensors. The control unit 32 compares the current orientation to a target orientation to compute a rotation metric. For example, control unit 32 computes the difference between the current and target orientation. This is computed independently in all axis and independently between orientation and heading, as a necessary requirement for true 6DOF capability. An example of an orientation change metric is seen in FIG. 7.

At 608, the control unit 32 triggers control commands to actuate components of the vehicle 10 based on the computed rotation metric to pivot or rotate components thereof. The control unit 32 controls the components of vehicle 10 separately and independently. For example, control unit 32 controls movement of each propulsion unit 14 separately and independently of the others by issuing control commands to separate motors, each motor coupled to a propulsion unit 14. The propulsion units 14 may pivot in any direction from the actuation provided to the primary servo motor 22 and secondary servo motor 24, controlled by the main control unit 32. The gimbal frame 20 that connects the primary servo motor 22 and secondary motor 24 may provide continuous pivoting ability for the propulsion units 14. The rotation and computation may be implemented by the control unit 32 in real-time and in a continuous manner. This process is done for each propulsion unit individually based on the target movement required for the vehicle 10. The individual process allows embodiments described herein to have the same 6DOF for an arbitrary amount of propulsion units 12 when in quantities above 2.

Embodiments have at least three propulsion units 12 to give the vehicle enough vector points to be capable of flight in uncoupled heading and orientation. Fewer than 3 can limit the vehicle to less maneuverability, while any higher number does not have an adverse effect on function. This is because the main control unit 32 intelligently distributes the target output vector to each propulsion unit to give the whole vehicle 10 equal maneuverability in any configuration that satisfies the conditions above.

The use of two degrees-of-freedom in each propulsion unit between the propellers and the frame provides unique functionality. The distributed target output vector in each propulsion unit can be in arbitrary magnitude and direction, overall enabling the entire vehicle to have the unique six degrees-of-freedom maneuverability during hover or flight.

Embodiments described herein may avoid gimbal lock to provide the novel function required. This is done by the use of inverse kinematics for each propulsion unit. This allows for consistent orientation of the rotor assembly 28 in each propulsion unit 12 to the target orientation without any conditions of unreachable orientation that are otherwise possible when only two degrees-of-freedom are not sensibly utilized.

Embodiments described herein may implement a calibration mode or step. For example, given that movement of a component is separate from rotation of another component, the control unit 32 can calibrate each component individually.

Embodiments described herein provides a structure that allows rotation while the rotor is active. For example, a half circle or fork structure configuration enables a rotor to be orthogonal to another rotor while never entering a position where a rotor may collide with the fork structure. This may provide two degrees of freedom and two axis of rotation.

Embodiments described herein may enable the vehicle to not have to stay in any orientation with tilting or other movement of the rotors with full freedom of rotation. Embodiments described herein may enable the vehicle to vary speed independent of orientation. Embodiments described herein may enable variation of thrust between motors in combination to varying angle, for example. The rotor is designed to keep the device level by varying thrust appropriately as calculated by the main control unit 32.

In another aspect, embodiments may include vehicles with obstacle avoidance systems. These systems can utilize sensors to determine the proximity of impeding obstacles or approaching solid bodies, and can override the user control input to automatically avoid collision. An example of such a system application would be the use of ultrasonic proximity sensors to detect the distance of the aerial vehicle from a solid wall. A calculation is made based on aerial vehicle distance to the wall, aerial vehicle velocity and acceleration, and if necessary, an automatic avoidance of the wall is triggered by steering the aerial vehicle away from the wall. The system would also be effective in use for bodies approaching the aerial vehicle (like birds) as it would be for still objects (like walls). The calculations made would be very similar as the distance, velocity and acceleration are relative measures of the aerial vehicle and the obstacle. Other obstacle avoidance systems may also be implemented.

In another aspect, embodiments may include a suite of on board sensors for use in monitoring flight conditions and diagnosing various conditions of the aerial vehicle. These sensors may include but are not limited to motor RPM sensors, temperature sensors, current sensors, voltage sensors, vibration sensors and torque sensors. These sensors measure, log and transmit various parameters of the aerial vehicle condition. For example, battery voltage measurement and logging allows for the prediction of remaining battery life and/or flight time. The logged voltages, after empirical derivation, can also be used to predict a reasonable time within which the battery needs to be replaced. Another example of sensor use is the use of temperature sensors at motors and battery. These sensors can be used to indicate overheating and trigger an alert or automatic landing procedure. This type of function will prevent catastrophic aerial vehicle failure and improve maintenance procedures. Another example of condition monitoring through sensors would be the use of vibration sensors. Vibration sensors placed throughout the propulsion units and/or hull can indicate that motors need repair or replacement. Empirical derivation of safety limits and mean failure times can thus be used to develop comprehensive predictive maintenance schedules and automatic safety features which prevent unsafe use by initiating safe landing and lockout procedures. Combinations of sensors can be used to infer important aerial vehicle parameters that are otherwise not possible. For example, the use of a temperature sensor and vibration sensor at the motor can indicate a specific failed motor where neither sensor alone could reasonably assert this information. In such a manner, sensors will be used in current and future embodiments in the purpose of providing critical operator feedback, initiating automatic safety protocols, notification of aerial vehicle maintenance condition and enabling predictive maintenance routines.

In another aspect, embodiments may be highly modular. All parts of the drone may be completely integrated (fixed), completely detachable or any combination of the two. Modular assembly of the aerial vehicle is such that very little effort and skill is needed to replace any given component like a battery, propulsion unit, sensor, control unit, radio transmitter/receiver, landing gear, hull segment, payload or any other attachment. Modularity is a highly desirable design paradigm used in combination with the predictive maintenance system proposed above to provide very reliable end-user product. Modularity allows untrained or very low-trained users to replace entire blocks of the system, like a battery or propulsion unit, with snap-in replacements.

In another aspect, embodiments may include different power sources than on board electrical (battery). Such power sources include but are not limited to on board electric generating methods, pneumatic, hydraulic, fossil fuel or others. Such future embodiments would utilize the same control and operating principles of uncoupled heading and orientation as described earlier. On-board electric generating methods include any source of electric generation on board by using a fuel source or combination of fuel sources. An example of such an iteration would be using an on-board gasoline driven electric generator to recharge a battery during flight, thus increasing flight time capability. Another example of such an iteration would be use of a pneumatic (compressed gas) source to directly drive the motors or generate electrical power for a generator to charge a battery in flight. Another potential iteration of the aerial vehicle described would be the inclusion of hybrid power sources to optimize flight time and control characteristics of the vehicle. For example, using a consistent and energy dense power source like a fossil fuel engine to provide the main thrust force required to sustain lift, and using another highly controlled drive system like electric battery power to provide controlling power. This system combines the energy density of an engine to provide long flight times while also enabling maneuverability by using the responsive electric battery power source. Other iterations are possible using any single or combination of power sources to drive the propulsion units.

Example Applications

The following section describes potential applications that may be practiced in regards to some embodiments. There may be other, different, modifications, etc. of the below potential applications, and it should be understood that the description is provided as non-limiting, illustrative examples only. For example, there may be additions, omissions, modifications, and other applications may be considered.

The greatest improvement in function will pertain to the field of aerial imaging and mapping, where the uncoupled heading and orientation will allow directly mounted imaging and scanning equipment to be kept horizontal irrespective of vehicle velocity or acceleration. This allows for more predictable scanning and imaging equipment positioning reducing the scanning errors, improving quality.

Other likely applications would be in novel applications not currently effectively satisfied by any aerial vehicle, such as window washing, parcel delivery, painting, surveillance, and indoor scanning each benefitting from a great improvement in stability of this novel invention over current solutions.

Possible applications would be in non-horizontal landing and take-off capabilities including but not limited to banked or sloped surfaces, walls, roofs, ceilings, curved surfaces and others.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements). In some cases, the connection may be permanent or removable.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. An aerial vehicle (AV) comprising at least three gimballed thrust or propulsion units driven by an on board electrical power source, and a processor configured to:
   determine a current AV orientation and heading measurement using sensor data;
   determine a rotation metric using the current AV orientation and heading measurement and a target AV orientation and heading measurement;
   determine a collective thrust vector and a collective moment vector;
   dynamically split the collective moment vector for the AV into individual moment vectors for each propulsion unit, wherein the individual moment vectors are not equal at each propulsion unit;
   dynamically split the collective thrust vector for the AV into individual thrust vectors for each propulsion unit, wherein the individual thrust vectors are not equal at each propulsion unit; and
   trigger control commands, based on the rotation metric and the split collective thrust vector and the split collective moment vector, to:
   actuate thrust magnitude; and
   independent from the thrust applied to any gimballed thrust or propulsion unit, actuate movement of at least three gimballed thrust or propulsion units relative to a frame of the AV;
   wherein the orientation of the gimballed thrust or propulsion units is independent of:
   the orientation of the frame of the AV; and
   any other thrust or propulsion unit.

2. The aerial vehicle as claimed in claim 1, wherein movement and/or change in orientation of the vehicle occurs due to the movement of the at least three gimballed thrust or propulsion units.

3. The aerial vehicle as claimed in claim 1, comprising:
   a first power source for the thrust force; and
   a second power source for independently controlling the movement of the at least three gimballed thrust or propulsion units relative to the frame of the AV.

4. The aerial vehicle as claimed in claim 1, wherein the thrust magnitude of each propulsion unit is arbitrary during the movement of the at least three gimballed thrust or propulsion units.

5. The aerial vehicle as claimed in claim 1, wherein movement of the at least three gimballed thrust or propulsion units occurs while their rotors are active.

6. The aerial vehicle as claimed in claim 1, wherein the processor is configured to receive sensor data to determine the proximity of impeding obstacles or approaching solid bodies.

7. The aerial vehicle as claimed in claim 1, capable of hover and flight in any orientation completely independent of its three-dimensional heading, by using movement of the gimballed thrust or propulsion units to control movement and orientation of the aerial vehicle.

8. The aerial vehicle as claimed in claim 1, wherein at least one of:
   the aerial vehicle comprises at least two gimballed thrust or propulsion units with the ability to orient and vary thrust independently to the hull or any other thrust or propulsion units; or
   the aerial vehicle is driven by any power source or combination of power sources, including on board hybrid electric generating methods, pneumatic, hydraulic, fossil fuel or others.

9. The aerial vehicle as claimed in claim 1, comprising at least one of:
   supporting components, including landing gear, wireless communication and/or sensors;
   detachable gimballed thrust or propulsions units;
   at least one mount for auxiliary attachments, including at least one of batteries, sensors, actuators, electronics, or other modules that provide functionality to the vehicle; or
   a permanently installed auxiliary system or other attachment, including at least one of:
   a fixed propulsion unit; or
   a fixed auxiliary component.

10. The aerial vehicle as claimed in claim 1, wherein the processor is configured to at least one of:
    divide a collective thrust vector between different classes of propulsion;
    dynamically divide a collective movement vector within the propulsion unit at the centre of gravity of the aerial vehicle, wherein each axis of the collective movement vector comprises a combination of thrust variations within propulsion units on the rotation axes that combine to a sum of zero;
    give priority to a large propulsion unit for producing an inverse gravity vector; or
    give priority to a small propulsion unit for heading correction.

11. The aerial vehicle as claimed in claim 1, wherein at least one of:
    at least one thrust or propulsion unit does not have a symmetrical counterpart; or
    at least one thrust or propulsion unit is located on a different horizontal plane than a hull of the aerial vehicle.

12. The aerial vehicle as claimed in claim 1, wherein to determine the collective thrust vector, the processor is configured to:
    determine a calibration modifier for each propulsion unit based on at least one of:
    vehicle orientation;
    vehicle acceleration;
    propulsion unit failure;
    thrust profile of the propulsion unit; or
    location of the propulsion units relative to the centre of mass of the vehicle;

wherein the collective thrust vector includes the calibration modifier for each propulsion unit.

13. The aerial vehicle as claimed in claim 1, wherein the current AV orientation and heading measurement includes at least one of:
   a movement vector of the AV;
   a current AV heading that is independent of a current AV orientation;
   a current AV orientation that is independent of its three-dimensional heading; or
   a current AV orientation that is independent of its three-dimensional movement vector.

14. The aerial vehicle as claimed in claim 1, wherein at least one of the collective thrust vector or the collective moment vector is split at least one of:
   dynamically;
   preferentially; or
   between different classes of propulsion units.

15. A process for an aerial vehicle (AV) comprising the steps of:
   determining a current AV orientation measurement and heading using sensor data;
   determining a rotation metric using the current AV orientation and heading measurement and a target AV orientation and heading measurement;
   determining a collective thrust vector and a collective moment vector;
   dynamically splitting the collective moment vector for the AV into individual moment vectors for each propulsion unit, wherein the individual moment vectors are not equal at each propulsion unit;
   dynamically splitting the collective thrust vector for the AV into individual thrust vectors for each propulsion unit, wherein the individual thrust vectors are not equal at each propulsion unit; and
   triggering control commands, based on the rotation metric and the split collective thrust vector and the split collective moment vector, for:
      actuating thrust magnitude of the at least three gimballed thrust or propulsion units relative to a frame of the AV; and
      independent from the thrust applied to any gimballed thrust or propulsion unit, actuating movement of at least three gimballed thrust or propulsion units relative to the frame of the AV;
   wherein the orientation of the gimballed thrust or propulsion units is independent of:
      the orientation of the frame of the AV; and
      any other thrust or propulsion unit.

16. The process as claimed in claim 15, wherein movement and/or change in orientation of the vehicle occurs due to the movement of the at least three gimballed thrust or propulsion units.

17. The process as claimed in claim 15, wherein:
   a first power source powers the thrust force; and
   a second power source independently powers the rotational movement of the at least three gimballed thrust or propulsion units relative to the frame of the AV.

18. The process as claimed in claim 15, wherein the thrust magnitude can be arbitrary during the movement of the at least three gimballed thrust or propulsion units.

19. The process as claimed in claim 15, wherein the aerial vehicle is capable of hover and flight in any orientation completely independent of its three-dimensional heading, by using movement of the gimballed thrust or propulsion units to control movement and orientation of the aerial vehicle.

20. The process as claimed in claim 15, wherein the current AV orientation and heading measurement includes at least one of:
   a movement vector of the AV;
   a current AV heading that is independent of a current AV orientation;
   a current AV orientation that is independent of its three-dimensional heading; or
   a current AV orientation that is independent of its three-dimensional movement vector.

21. The process as claimed in claim 15, comprising at least one of:
   dividing a collective thrust vector between different classes of propulsion;
   dynamically dividing a collective moment vector within the propulsion unit at the centre of gravity of the aerial vehicle, wherein each axis of the collective movement vector comprises a combination of thrust variations within propulsion units on the rotation axes that combine to a sum of zero;
   giving priority to a large propulsion unit for producing an inverse gravity vector; or
   giving priority to a small propulsion unit for heading correction.

22. The process as claimed in claim 15, wherein at least one of:
   at least one thrust or propulsion unit does not have a symmetrical counterpart; or
   at least one thrust or propulsion unit is located on a different horizontal plane than a hull of the aerial vehicle.

23. The process as claimed in claim 15, wherein determining the collective thrust vector comprises:
   determining a calibration modifier for each propulsion unit based on at least one of:
      vehicle orientation;
      vehicle acceleration;
      propulsion unit failure;
      thrust profile of the propulsion unit; or
      location of the propulsion units relative to the centre of mass of the vehicle;
   wherein the collective thrust vector includes the calibration modifier for each propulsion unit.

24. The process as claimed in claim 15, wherein at least one of the collective thrust vector or the collective moment vector is split at least one of:
   dynamically;
   preferentially; or
   between different classes of propulsion units.

* * * * *